United States Patent Office 2,764,072
Patented Sept. 25, 1956

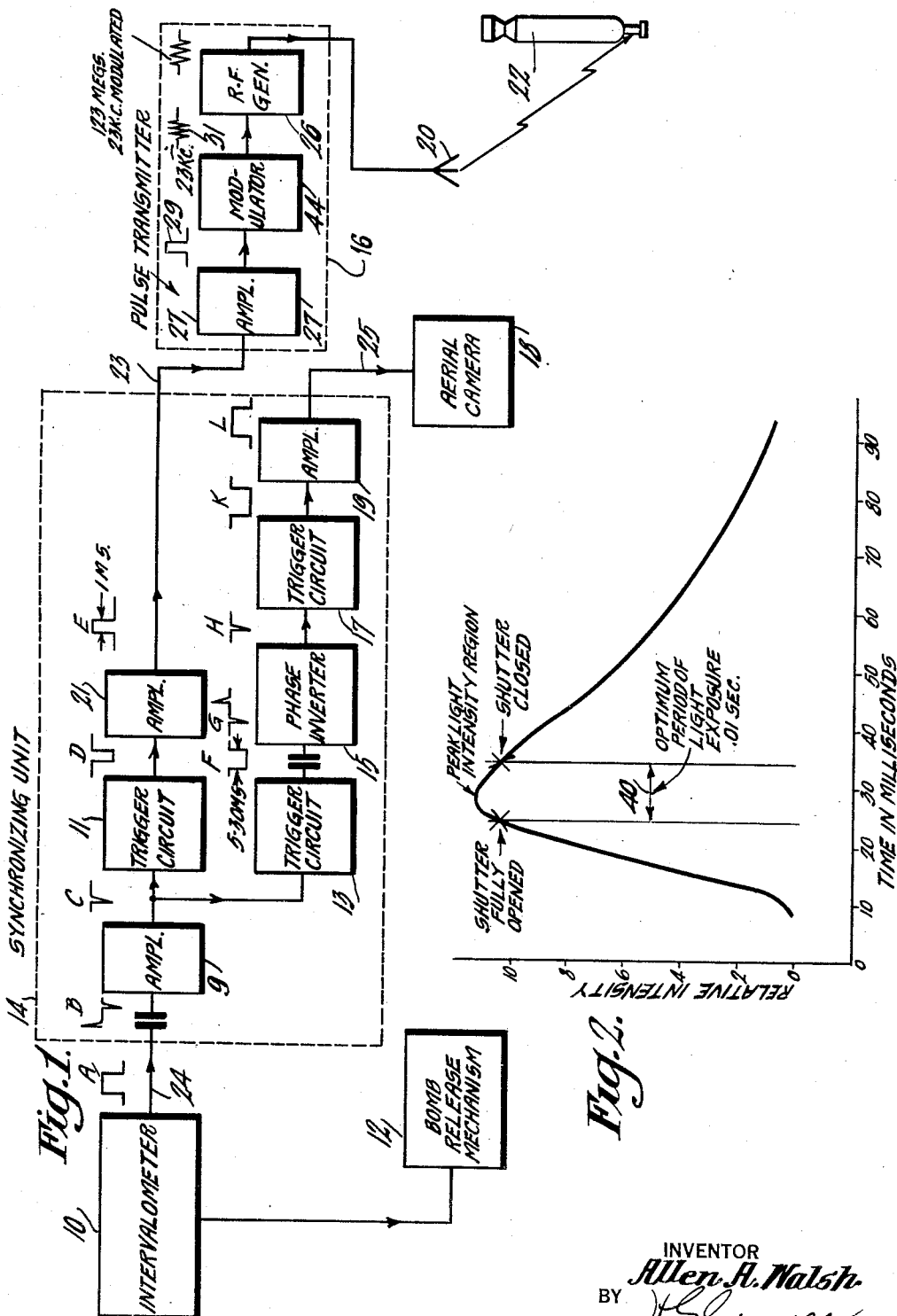

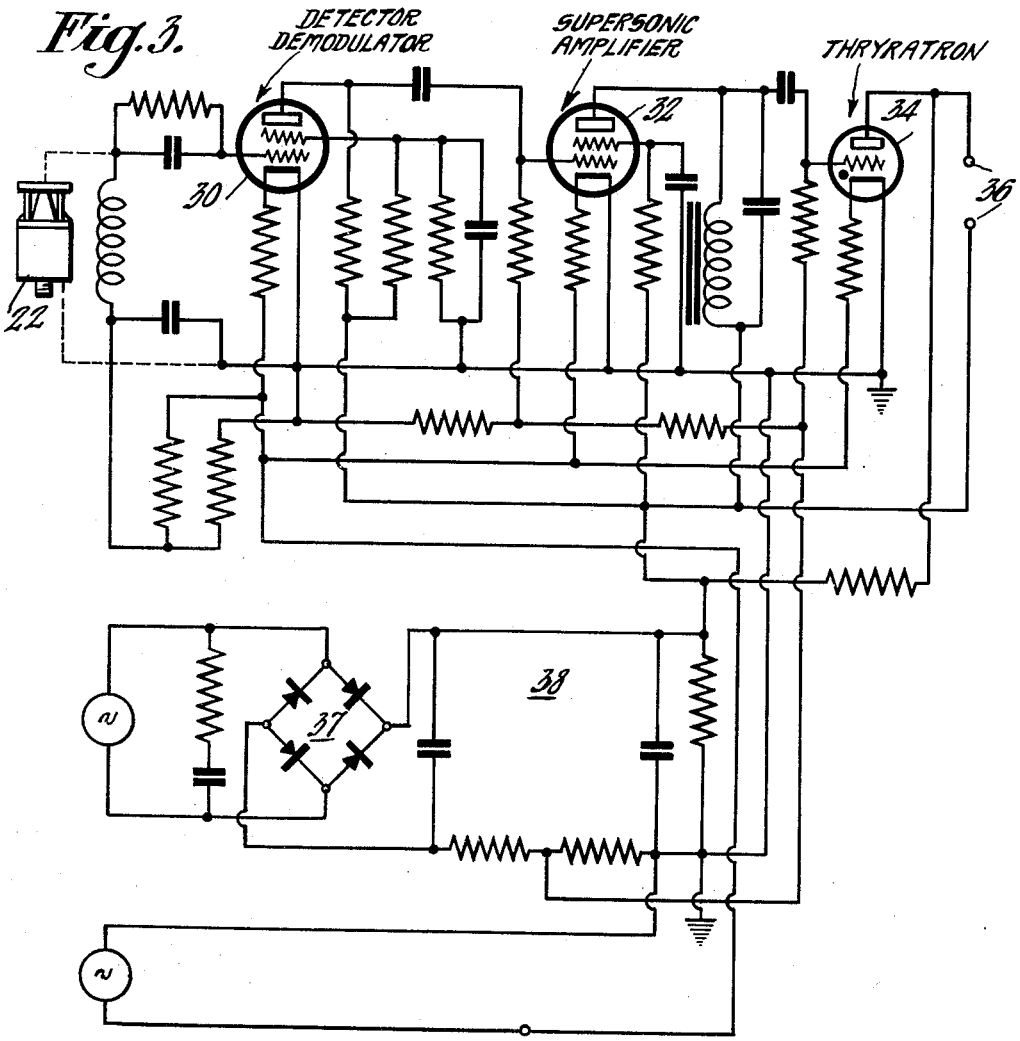

2,764,072

FLASH SYNCHRONIZATION FOR AERIAL PHOTOGRAPHY

Allen A. Walsh, West Englewood, N. J., assignor, by mesne assignments, to the United States of America as represented by the Secretary of the Air Force Application April 18, 1946, Serial No. 662,979

7 Claims. (Cl. 95—11.5)

This invention relates to night time photography and particularly to a method of and apparatus for synchronously firing a photoflash bomb in conjunction with airborne camera equipment.

In night-time aerial photography it is known to use a photoflash bomb with a mechanical control fuze for use with airborne camera equipment. The fuze on the bomb is usually set to fire the bomb at a predetermined height above the ground and at a predetermined time after it has been released from the plane. The aerial camera shutter remains open and the exposure is determined by the duration of the photoflash bomb. Such known arrangement suffers from the disadvantage of blurring of the photograph caused by the fact that the camera shutter is open over a period of time starting from a point of low light intensity from the photoflash bomb and ending at another point of low light intensity, and the plane carrying the camera equipment is moving over this appreciable period of photograph exposure. Another system makes use of the same type bomb detonation and with the camera shutter controlled by means of a photo electric cell mechanism which is actuated by light from the photoflash bomb.

An object of the present invention is to provide an improved method of synchronizing aerial camera operation for peak intensity of a photoflash bomb, as a result of which exposures are made only during the period of maximum light intensity from the photoflash bomb.

A further object is to synchronize the firing of a falling photoflash bomb with the operation of an aerial camera located in the aircraft from which the bomb was released.

Another object is to provide a method of aerial photography wherein one or more photoflash bombs are fired simultaneously by means of radio operated bomb fuzes synchronized with aerial camera operation.

Briefly stated, the system of the invention employs a radio operated photoflash bomb fuze containing a radio receiver power supply comprising a wind driven generator, a rectifier, a filter, and a gaseous conduction device (Thyratron) for exploding the detonator. Air borne equipment is installed in the photographic plane and comprises an intervalometer, a synchronizing unit, a pulse transmitter and an aerial camera.

The general overall operation of the system is as follows: The intervalometer is first preset for the mission requirements and then started, simultaneously producing a direct current pulse which is delivered to the plane bomb release mechanism causing the release of a photoflash bomb. Immediately upon release of the bomb, the wind driven generator on the bomb fuze starts rotation and supplies power to the photoflash bomb fuze and after a predetermined number of revolutions of this generator the fuze becomes armed and is ready to be fired. The intervalometer which has been running during this time delivers a master pulse to the synchronizing unit upon the completion of the first cycle. This master pulse, after proper shaping and timing, produces two pulses, one of which is used to key the radio transmitter and the other to actuate the camera shutter mechanism. The transmitter pulse from the synchronizing unit keys the transmitter on for a short time (approximately one millisecond), thus enabling the transmitter to send out a radio frequency signal directed toward the falling photoflash bomb. This radio frequency signal is detected and demodulated by the receiver in the photoflash bomb fuze attached to the falling bomb. After demodulation, the received signal is amplified and applied to the grid of a gas tube (Thyratron) and causes the "Thyratron" to ionize. The resulting high plate current drawn by the Thyratron upon being ionized causes explosion of the fuze detonator and complete detonation of the photoflash bomb. The camera operating pulse is delayed by an amount equal to the difference between the bomb fuzing time and the time required to operate the camera shutter, so that the shutter is open only during the period of maximum light intensity from the photoflash bomb.

Under certain conditions of use of the invention, it is advisable to modulate the radio frequency signal emitted by the transmitter with an alternating current signal, for example, of a supersonic frequency, and to require the reception of this modulated radio frequency signal to fire the photoflash bomb. This modulation of the radio frequency signal serves to prevent possible jamming and premature setting off of the photoflash bomb by those who may wish to interfere with the operation of the invention and who may not be aware of the frequency of the alternating current employed to modulate the radio frequency transmitter in the plane. For commercial photograph operations, however, the radio frequency signal need not be modulated by a supersonic signal.

A more detailed description of the invention follows in conjunction with a drawing, wherein:

Fig. 1 illustrates a block diagram of the system of the invention;

Fig. 2 is a curve graphically illustrating the average time-intensity characteristic of a photoflash bomb actually tried out in practice, with markings on this curve showing the period of maximum light intensity over which an exposure is made by the airborne camera equipment; and Fig. 3 schematically illustrates the essential circuit elements of the bomb fuze employed in the photoflash bomb.

In Fig. 1, which shows the system of the invention, there is shown an intervalometer 10 which feeds pulses both to a bomb release mechanism 12 and to a synchronizing unit 14. The synchronizing unit 14 in turn feeds two pulses (which are time delayed relative to each other and also relative to the pulse from the intervalometer to the mechanism 12) to a pulse transmitter 16 and an aerial camera 18. The output of the pulse transmitter feeds a suitable antenna 20 which radiates a pulse of radio frequency energy to the falling photoflash bomb 22 which had been released by the bomb release mechanism 12.

The intervalometer 10 is an electromechanical timing device and is used as the master control for the entire synchronized photoflash system of the invention. In normal operation, this instrument performs two functions, first the release of bombs from the aircraft, and second, the production of the master pulse which is fed to the synchronizing unit and which ultimately causes bomb detonation and operation of the aerial camera. The pulse passed by the intervalometer 10 to the bomb release mechanism 12 causes the release of the bomb 22. Such bomb release mechanism need not be described herein since they are well known in the art and have been used in connection with intervalometers for aerial photography. By way of illustration, reference is herein made to an intervalometer disclosed in United States Patent 2,388,686 granted November 13, 1945, for a general reference to instruments of this type, and to copending application Serial No. 655,336 filed March 18, 1946 jointly by me and G. C. Peers for a description of the preferred and improved type of intervalometer, now Patent No. 2,553,223, issued May 15, 1951.

In order to more fully understand the operation of the system of the invention, there are shown voltage wave forms immediately above the various connections in which they appear in the system. The intervalometer 10 feeds an initiating pulse A over lead 24 to the synchronizing unit 14. This voltage pulse A is differentiated and the result is shown in wave form B which illustrates that sharp peaked positive and negative impulses are produced from the starting and trailing edges of pulse A. The positive peaked impulse of wave form B is applied to the vacuum tube amplifier stage 9 in the synchronizing unit and this amplifier stage serves to supply a peaked impulse C of inverted polarity to trigger circuits 11 and 13. At this time it should be noted that the trigger circuit 13 feeds a phase inverter 15 in turn coupled to another trigger circuit 17 whose output feeds an amplifier 19. Trigger circuits 11, 13, and 17 have one degree of electrical stability and are of the type known in the art as the flip-flop or Eccles-Jordan type. Each of these trigger circuits comprises a pair of electron discharge devices whose grids and anodes are interconnected regeneratively. In the stable state of trigger circuit, one vacuum tube is normally conducting while the other is non-conducting. The application of a triggering or firing pulse to this trigger circuit causes the trigger circuit to pass from its stable to its active state, in which condition the current passing conditions of the two tubes are reversed. After a period of time depending upon the time constants of the trigger circuit, the trigger will restore itself to the stable state.

The trigger circuit 11 has a fixed time delay and furnishes an output pulse of wave form D whose duration is one millisecond. The pulse of wave form D is fed to the amplifier stage 21 which provides an output pulse E of reversed polarity and also of one millisecond duration. It is this pulse E which is sent over lead 23 to the pulse transmitter 16 and serves to key the pulse transmitter.

The trigger circuits 13 and 17 in conjunction with the phase inverter 15 constitute a time delay circuit for supplying a pulse of controllable duration and adjustable time delay to the aerial camera 18 through the amplifier 19. In practice, trigger circuit 13 is fired by the pulse of wave form C and produces a pulse whose delay may be adjusted anywhere over a range of five to thirty milliseconds. This is achieved by suitable adjustment of a control, such as a dial, in the trigger circuit 13 for selecting any one of several condensers for controlling the time constant or duration of the trigger circuit in the active state. The output pulse from trigger circuit 13 is indicated by wave form F. The pulse F produced by the trigger circuit 13 is differentiated to produce wave form G, and the resulting wave form G fed to a phase inverter 15 which passes a pulse of negative polarity H to the trigger circuit 17. Trigger circuit 17 is designed to have a fixed time delay and to provide a pulse K in its output of a duration appreciably longer than the duration of the pulse E. This pulse K is of negative polarity and is inverted by amplifier 19 in order to produce pulse L. Pulse L is fed over lead 25 to the aerial camera 18. The duration of pulse L is sufficiently long to trip the solenoid controlling the shutter of the aerial camera 18.

The short duration pulse E of one millisecond is fed over lead 23 to the amplifier 27 in the pulse transmitter in order to produce a pulse 29 in the output of the amplifier 27. This pulse 29 is used to key the modulator 44 which, when keyed, supplies a supersonic frequency modulation, for example twenty-three kilocycles shown on the wave form 31, to the radio frequency generator 26. The radio frequency generator 26 is normally biased to cut off, and when keyed produces a carrier of the order of 123 megacycles; for example, this carrier being modulated by the 23 kilocycle pulse fed to the generator 26 by the modulator 44.

The keying of the pulse transmitter 16 results in the transmission of a pulse from the radio frequency generator 26 which is sent out over the antenna 20. This pulse radiated by the antenna 20 is, as mentioned before, a one millisecond radio frequency pulse modulated at the supersonic rate. The antenna 20 is so designed and arranged that it transmits the pulse radiated thereby to the falling photoflash bomb 22 which was previously released by the bomb release mechanism 12. The supersonic modulation impressed on the pulse produced by the generator 26 is desirable to provide security against radio jamming from interfering sources and also a form of secondary selectivity. The aerial camera actuating pulse L is so delayed that the camera shutter in apparatus 18 is open only during the period of maximum light intensity from the photoflash bomb 22.

The bomb 22, whose fuze circuit is schematically shown in Fig. 3, uses the fuze ring tip in conjunction with the bomb casing as the receiver antenna system in a manner similar to that employed with some types of proximity fuzes. This bomb receiver includes a radio frequency tuning unit feeding the grid of a vacuum tube type grid leak detector 30. This detector operates to affect a relatively high gain vacuum tube amplifier stage 32 whose plate circuit is tuned to the supersonic frequency by means of an L—C circuit having an effective Q of approximately 16. The output of the amplifier 32 is fed to the control grid of a gaseous conduction tube 34 (Thyratron), causing ionization of the gas within the gas tube and resulting in firing of the fuze detector which is connected in the plate circuit of the gas tube. Thus, it will be seen that the Thyratron control grid is actuated from the signal voltage across the tuned plate circuit of the amplifier stage 32. In order to prevent excessive amplification of the filament generator frequency, all coupling condensers are made as small as possible.

The wind driven generator of the bomb 22 is not shown but comprises a six pole permanent magnet machine which delivers frequencies of the order of 1500 cycles per second when driven at 30,000 R. P. M. Low alternating current is applied directly to all filaments of the bomb fuze, whereas the B supply (anode supply) is rectified and filtered through an oxide rectifier 37, and a resistance-capacity type filter 38. A safety arming system is utilized in the plate circuit of the gas tube 34, to prevent this circuit from being completed until a predetermined number of revolutions has been made by the wind driven generator. This may be accomplished by means of a step down gear train having a reduction ratio of 7800 to 1 which operates a rotating contact known as the "squib rotor." This "squib rotor" makes contact through the squib or ignition element from the thyratron plate to the +B supply. To prevent premature firing of falling bombs when released in train sequence, each fuze is equipped with an external mechanical arming device which prevents rotation of the wind driven generator until a predetermined time has elapsed after release from the airplane. After the passage of the preselected time interval, the mechanism is jettisoned from the receiver unit and the generator will immediately start rotation. The firing of the thyratron 34 causes sufficient current to start the explosive train for the photoflash bomb. The detonator which is part of this explosive train, is coupled to the terminals 36 in the plate circuit of the thyratron tube 34.

In one embodiment of a photoflash bomb 22 satisfactorily tried out in practice, the receiver was located within a small fuze screwed into the fuze-well of the bomb. An insulated metallic ring at the tip end of the assembly working against the bomb casing served as an antenna. In the system successfully tried out in practice employing a photoflash bomb and an aerial camera shutter, the average time from the receipt of the ignition pulse by the bomb to maximum light intensity was 28 milliseconds. The average time required for the aerial camera shutter operation was 13 milliseconds. Hence, pulse L for operating the aerial camera 18 was delayed for 15 milliseconds by the apparatus 13, 15, 17 and 19 after the pulse E which was fed to the pulse transmitter 16. Measurements actually made on photoflash bombs in conjunction with the system of the present invention produced curves of average time intensity characteristics such as shown in Fig. 2. The shutter of the aerial camera 18 was open only during the period of peak light intensity covering an interval of approximately ten milliseconds in the region indicated by the double arrow line 40 of Fig. 2. The shutter was open for a period of only one-hundredth of a second, although it should be understood that the shutter opening can be adjusted to cover a longer or shorter period of time.

Obviously the invention is not limited to the specific system illustrated for electronically delaying the pulses in the synchronizing system since other known types of apparatus can be employed to achieve the same result. For example, use may be made of blocking oscillators.

What is claimed is:

1. The method of aerial photography from an aircraft equipped with an intervalometer, radio transmitting equipment, an aerial camera and bomb release mechanism, which comprises causing said intervalometer to actuate said release mechanism to release a radio operable photoflash bomb, producing a pulse from said intervalometer, causing said last pulse to electronically produce two other pulses which are time delayed with respect to each other by a predetermined interval, utilizing the earlier one of said two pulses to key said transmitter to transmit a pulse of radio frequency energy for firing said released bomb, and utilizing the other of said two pulses to actuate said camera, the time delay between said two pulses produced from said intervalometer pulse being such that the camera shutter is open only during the period of maximum light intensity from said photoflash bomb.

2. The method of aerial photography from an aircraft equipped with camera equipment, which comprises dropping a radio operable photoflash bomb having a radio receiver therein and bomb detonating means responsive to a signal received by said radio receiver for producing illumination from said bomb, directively transmitting a radio pulse from said aircraft toward said falling bomb for operating said photoflash bomb, producing a direct current pulse to actuate said camera equipment, and delaying the production of said direct current pulse relative to said radio pulse by an interval of time sufficient to cause said camera to operate in synchronism with the illumination from said photoflash bomb.

3. Photography equipment comprising an intervalometer for producing a pulse, a synchronizing unit responsive to said pulse for producing two other pulses which are delayed a controllable interval of time relative to each other, a pulse radio transmitter responsive to one of said two pulses for radiating a pulse of radio frequency energy, camera shutter mechanism responsive to the other of said two pulses, and a source of illumination responsive to energy radiated by said transmitter.

4. Photography equipment comprising an intervalometer for producing a pulse, a synchronizing unit responsive to said pulse for producing two other pulses which are delayed a controllable interval of time relative to each other, a pulse radio transmitter responsive to one of said two pulses for radiating a pulse of radio frequency energy, camera shutter mechanism responsive to the other of said two pulses, the pulse delivered to said radio transmitter being shorter than and in advance of the pulse delivered to said camera, and a source of illumination responsive to energy radiated by said transmitter.

5. In an aircraft, aerial photography equipment comprising an intervalometer, bomb release mechanism on said craft adapted to be actuated by said intervalometer for releasing an illumination bomb, a radio transmitter, said illumination bomb including receiving apparatus responsive to a wave radiated from said radio transmitter for firing said bomb, a camera, a synchronizing unit coupling the output of said intervalometer to said radio transmitter and camera, said synchronizing unit being responsive to a pulse from said intervalometer for producing two other pulses which are delayed relative to each other, means for controlling said radio transmitter by one of said pulses, and means for controlling said camera from the other of said pulses.

6. Apparatus in accordance with claim 5, characterized in this that said synchronizing unit comprises two paths, one of which includes a fixed time delay circuit and the other of which includes an adjustable time delay circuit, one of said paths extending to said transmitter and the other path extending to said camera.

7. Photography equipment comprising an intervalometer for producing a pulse, a synchronizing unit responsive to said pulse for producing two other pulses which are delayed a controllable interval of time relative to each other, a pulse radio transmitter responsive to one of said two pulses for radiating a pulse of radio frequency energy, camera shutter mechanism responsive to the other of said two pulses, the pulse delivered to said radio transmitter being shorter than and in advance of the pulse delivered to said camera, and a photoflash instrument having radio receiver apparatus responsive to energy radiated from said pulse radio transmitter for firing said photoflash instrument.

References Cited in the file of this patent

UNITED STATES PATENTS

| | | |
|---|---|---|
| 1,506,785 | Sperry | Sept. 2, 1924 |
| 1,936,595 | Goddard | Nov. 28, 1933 |
| 2,272,102 | Wildman | Feb. 3, 1942 |
| 2,324,075 | Gillon et al. | July 13, 1943 |
| 2,402,580 | Roters | June 25, 1946 |
| 2,408,764 | Edgerton | Oct. 8, 1946 |
| 2,419,978 | Wildman | May 6, 1947 |